No. 683,209. Patented Sept. 24, 1901.
M. KILIAN.
FRUIT SHIPPING CRATE.
(Application filed July 12, 1901.)
(No Model.)
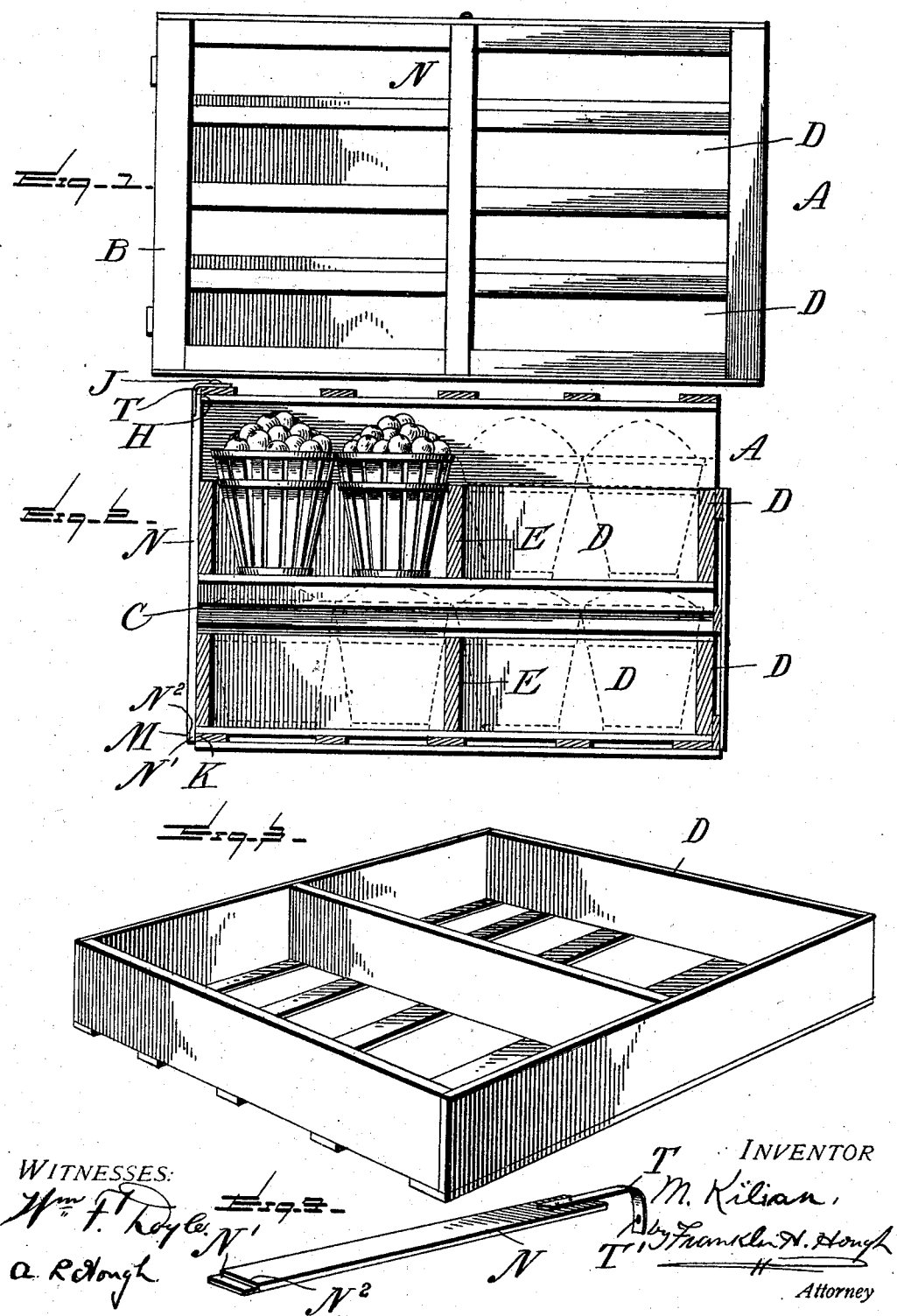

UNITED STATES PATENT OFFICE.

MARTIN KILIAN, OF NAPPANEE, INDIANA.

FRUIT-SHIPPING CRATE.

SPECIFICATION forming part of Letters Patent No. 683,209, dated September 24, 1901.

Application filed July 12, 1901. Serial No. 68,071. (No model.)

*To all whom it may concern:*

Be it known that I, MARTIN KILIAN, a citizen of the United States, residing at Nappanee, in the county of Elkhart and State of Indiana, have invented certain new and useful Improvements in Fruit-Shipping Crates; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in shipping-crates, designed especially for shipping berries, fruits, &c.; and it consists in the provision of a box having a series of sliding drawers one above the other and in which drawers the boxes containing the berries or other fruit are held, the series of drawers being held within the crate by means of a bar which is detachably held to the opposite edges thereof.

The invention will be hereinafter more fully described and then specifically defined in the appended claim and is illustrated in the accompanying drawings, which, with the letters of reference marked thereon, form a part of this application, and in which drawings similar letters of reference indicate like parts in the views.

Figure 1 is a side elevation of my improved crate. Fig. 2 is a vertical central sectional view. Fig. 3 is a detail in perspective of one of the drawers or trays. Fig. 4 is a detail view in perspective of the locking-bar.

Reference now being had to the details of the drawings by letter, A designates the crate, which may be of any suitable shape or size, which may be made of slats, with intervening spaces for ventilation, as may be desired, and is provided with a suitable hinged door B, which is slatted to allow for ventilation.

Mounted on cleats C on the opposite ends or sides of the crate is a series of trays or drawers D, which have slatted bottoms, with central partitions E. These trays or drawers should be of a suitable size to receive boxes of different sizes for containing berries or other fruit without any loss of space about the marginal edges of the boxes.

The front open side of the crate is recessed at its top and bottom edges, as at H and K, and the lower recess K is closed by means of a bar M. A bar N has one end recessed, as at N', forming a reduced portion which is designed to enter said recess K, the shoulder $N^2$ being adapted to rest upon said bar to limit its downward throw, while the outer face of said bar is flush with the outer face of the bar. The upper end of the bar normally rests in the recess H when the bar is in a locking position, and a strap T is fastened to the upper end of the bar and is provided with a slit T', designed to be caught over a lug or pin J on the top of the crate. When the series of trays have been placed within the crate, the bar is adjusted in place, said bar fitting against the outer faces of the drawers or trays, which will securely hold same in place. The door is designed to close over the trays when the bar is not used and may be held closed by any suitable means.

Having thus described my invention, what I claim to be new, and desire to secure by Letters Patent, is—

In combination with a crate for shipping berries, &c., a series of superimposed sliding trays, the edges of the open face of the crate being recessed, a bar closing one recess, a locking-strip having a recessed end designed to enter said closed recess and provided with a shoulder adapted to rest upon said bar, a strap fastened to the upper end of said strip and designed to engage a pin on the crate to hold said strip against the outer faces of the trays, and a suitable slatted door, as set forth.

In testimony whereof I hereunto affix my signature in presence of two witnesses.

MARTIN KILIAN.

Witnesses:
OLIVE HEPLER,
PERRY A. EARLY.